United States Patent [19]

Saiki

[11] Patent Number: 5,602,591

[45] Date of Patent: Feb. 11, 1997

[54] SYSTEM FOR GENERATING A WEIGHTING COEFFICIENT USING INTER-FRAME DIFFERENCE SIGNALS AT A CENTER PIXEL FOR DETECTING MOTION INFORMATION AND AT PIXELS SURROUNDING THE CENTER PIXEL AND QUANTIZING THE DIFFERENCE SIGNAL AT THE CENTER PIXEL

[75] Inventor: Masahiro Saiki, Chofu, Japan

[73] Assignee: Matsushita Electric Industrial Co., Ltd., Osaka, Japan

[21] Appl. No.: 251,273

[22] Filed: May 31, 1994

[30] Foreign Application Priority Data

Jun. 8, 1993 [JP] Japan .................................... 5-137287

[51] Int. Cl.$^6$ .................................................. H04N 7/01
[52] U.S. Cl. .......................................... 348/452; 348/699
[58] Field of Search ...................................... 348/699–701, 348/452, 458; H04N 7/01

[56] References Cited

U.S. PATENT DOCUMENTS

| | | | |
|---|---|---|---|
| 4,884,136 | 12/1989 | Ninomiya et al. | 348/701 |
| 4,941,045 | 6/1990 | Birch | 348/700 |
| 5,095,354 | 3/1992 | Sokawa et al. | 348/701 |
| 5,142,362 | 8/1992 | Masera et al. | 348/700 |
| 5,175,618 | 12/1992 | Ueda et al. | 358/136 |
| 5,289,274 | 2/1994 | Kondo | 348/699 |
| 5,381,183 | 1/1995 | Ishizuka et al. | 348/458 |

OTHER PUBLICATIONS

Yutaka Tanaka et al; "Processing Frame Difference Signals for Detection of Moving Areas"; Jul. 25, 1986; pp. 59–64.

*Primary Examiner*—Victor R. Kostak
*Attorney, Agent, or Firm*—Watson Cole Stevens Davis, P.L.L.C.

[57] ABSTRACT

The motion signal detection method achieves splendid motion signal detection both from a video signal having an inter-frame difference signal of the same level as noise and a video signal obtained when a fine-patterned object moves in parallel translation. A video signal processing apparatus is provided for use with the above-mentioned motion signal detection method. The inter-frame difference signal obtained by a subtractor is input to the space expander circuit and then to a weighting coefficient generating circuit to obtain a weighting coefficient, and on the other hand, the inter-frame difference signal is input to an absolute value calculating circuit and a low pass filter, and the output signal is digitized by a quantizing circuit by using a quantizing parameter, which is controlled by the weighting coefficient.

15 Claims, 5 Drawing Sheets

SYSTEM FOR GENERATING A WEIGHTING COEFFICIENT USING INTER-FRAME DIFFERENCE SIGNALS AT A CENTER PIXEL FOR DETECTING MOTION INFORMATION AND AT PIXELS SURROUNDING THE CENTER PIXEL AND QUANTIZING THE DIFFERENCE SIGNAL AT THE CENTER PIXEL

BACKGROUND OF THE INVENTION

1. Field of the Invention

The present invention relates to a method for detecting a motion signal of a video signal which searches motion information in the video signal, and also to a video signal processing apparatus using the same method.

2. Description of the Related Art

Heretofore, in a television receiving set or image special effect equipment for generating special effect images by changing the images by performing enlargement, contraction, rotation, or the like on video data, processing intended to improve the picture quality is carried out by converting an interlaced scanning video signal into a non-interlaced scanning video signal. More specifically, an interpolation scanning line is provided between the scanning lines of the non-interlaced scanning video signal to thereby generate the non-interlaced scanning video signal, with the result that the vertical-direction resolution of the video signal is improved and the flicker of the displayed picture is controlled.

In the above method, for the video signal of a still image, an interpolation scanning line is generated by data of the previous field, and for the video signal for a moving image, an interpolation scanning line is generated by data of the current field. In order to convert the interlaced scanning video signal into the non-interlaced scanning video signal, motion information in the video signal must be detected, and according to the result of this detection, the generating method of the interpolation scanning line must be changed.

with regard to the technique for detecting motion information of the interlaced scanning video signal, various methods have been proposed. In most of those methods, motion information is detected in pixel units depending on the magnitude of a difference signal between the input video signal and the video signal delayed by one frame. Such a method for detecting motion information is described at pages 211 to 212 of the prepared papers for the 1989 National Convention of the Institute of Television Engineers of Japan.

FIG. 4 is a block diagram showing an example of a conventional motion signal detection circuit. In FIG. 4, reference numeral 1 denotes a video signal input terminal, 2 a one-frame delay circuit, 3 a subtractor, 4 a low pass filter, 5 an absolute value calculating circuit, 6 a maximum value calculating circuit, 7 a coring control circuit, 8 a low pass filter, 9 a vertical edge detection circuit, 10 a time-space expander circuit, and 11 a motion signal output terminal.

The operation of the above-mentioned prior-art circut will now be described.

In FIG. 4, the video signal input from the video signal input terminal 1 and the video signal delayed by the one-frame delay circuit 2 undergo a subtraction process by the subtractor 3 to obtain an inter-frame difference value. The inter-frame difference value is deprived of noise by the low pass filter, and an absolute value is calculated by the absolute value calculating circuit 5. For the calculated absolute value, a maximum value nearest in terms of time and space is selected by the time-space expander circuit 10 and the maximum value calculating circuit 6. The selected maximum value is subjected to a coring process according to the vertical edge intensity of the input image by the vertical edge detection circuit 9 and the coring control circuit 7. In this prior-art example, the portion with a great vertical edge of the image receives a process similar to the process for a still image. The absolute value after the coring process is further deprived of noise by the low pass filter 8, and is output as motion information to the motion signal output terminal 11.

However, in the motion signal detection circuit, the condition for deciding whether to classify the picture portion as a "motion" or "still" portion is determined by a parameter of the coring control circuit 7 and, therefore, a motion signal having an inter-frame difference signal of the same level as noise cannot be detected.

In order to solve the above problem, a motion detection method using a target pixel for detecting motion information and the pixels in a space surrounding the center target pixel has been proposed. A motion signal detection method such as this is shown in Tanaka et al. "Processing Frame Difference Signals for Detection of Moving Areas", Technical Report of the Institute of Television Engineers of Japan, Vol. 10, No. 12, pages 59–64, for example.

FIG. 5 is a block diagram showing another example of the conventional motion signal detection circuit. In FIG. 5, reference numeral 1 denotes a video signal input terminal, 2 a one-frame delay circuit, 3 a subtractor, 12 a space expander circuit, 13 a plus/minus pixel number calculating circuit, 14 a moving amount calculating circuit, and 15 a motion signal output terminal.

The operation of this other prior art example will now be described.

In FIG. 5, the video signal input from the video signal input terminal 1 and the video signal delayed one frame by the one-frame delay circuit 2 undergo a subtraction process by the subtractor 3 to find an inter-frame difference value. The inter-frame difference value is output by the space expander circuit 12 along with the inter-frame difference signals at the pixels in a space surrounding the center target pixel. In this prior-art example, the inter-frame difference values at 5×5 pixels in a space surrounding the center target pixel are calculated. With regard to those inter-frame difference values, the total number of pixels p having positive difference values and the total number of pixels n having negative difference values are calculated. Then, the moving amount calculating circuit 14 calculates a motion evaluation value $\alpha$ from the numbers p and n mentioned above as shown in the following:

when $p \leq n$   $\alpha = p/n$ when $p > n$   $\alpha = n/p$ $0 \leq \alpha \leq 1$ Accordingly, the moving amount $1-\alpha$ is output from the motion signal output terminal 15.

The operation of the moving amount calculating circuit 14 will now be described with reference to FIG. 6. FIG. 6 shows an example of the inter-frame difference signal output by the subtractor 3 of FIG. 5.

In FIG. 6, the dotted line denotes a fundamental inter-frame difference signal when there is no noise, while the solid line denotes an inter-frame difference signal added with noise. When the inter-frame difference signal in FIG. 1 is expanded in space and then the p and n are calculated, the p and n become substantially the same number in the still-image region. Therefore, the motion evaluation value α comes closer to 1, and a moving amount close to 0 (still) is output. In the moving-image region of FIG. 6, a difference between p and n is large. Accordingly, the motion evaluation value α approaches 0, so that a moving amount (motion) close to 1 is output.

As has been described, in the above-mentioned one other example of the conventional motion information detection processing method, it is possible to detect a motion signal having the same level of an inter-frame difference signal as is caused by noise.

However, in the above-mentioned motion signal detection method, with regard to the video signal obtained when an object having a fine pattern moves in parallel translation, motion cannot be detected. To be more specific, when the inter-frame difference signal of the video signal such as mentioned above is calculated, like in the still-image region of FIG. 6 showing the other prior-art motion information detection method, the p and n become almost the same number and, therefore, a result of motion information detection indicates a wrong recognition that the image is "still", and a moving amount close to 0 is output.

SUMMARY OF THE INVENTION

The present invention has been made to solve the above-mentioned problem of the prior art, and has as its object to provide an excellent moving signal detection method capable of detecting motion information from a video signal having the same level of inter-frame difference signal as is caused by noise and also from a video signal obtained when an object of a fine pattern moves in parallel translation.

In order to achieve the above object, the present invention has such an arrangement to generate a weighting coefficient for motion information using inter-frame difference signals of a center pixel for detecting motion information and pixels in a space surrounding the center pixel, and by means of this weighting coefficient, control a parameter for quantizing the inter-frame difference signal of the center pixel for detecting motion information.

By the above arrangement, the present invention makes possible excellent motion information detection both from a video signal having an inter-frame difference signal of the same level as noise and from a video signal about a fine-patterned object which moves in parallel translation.

DESCRIPTION OF THE PREFERRED EMBODIMENTS

An embodiment of the present invention will be described with reference to the accompanying drawings.

Figure 1:
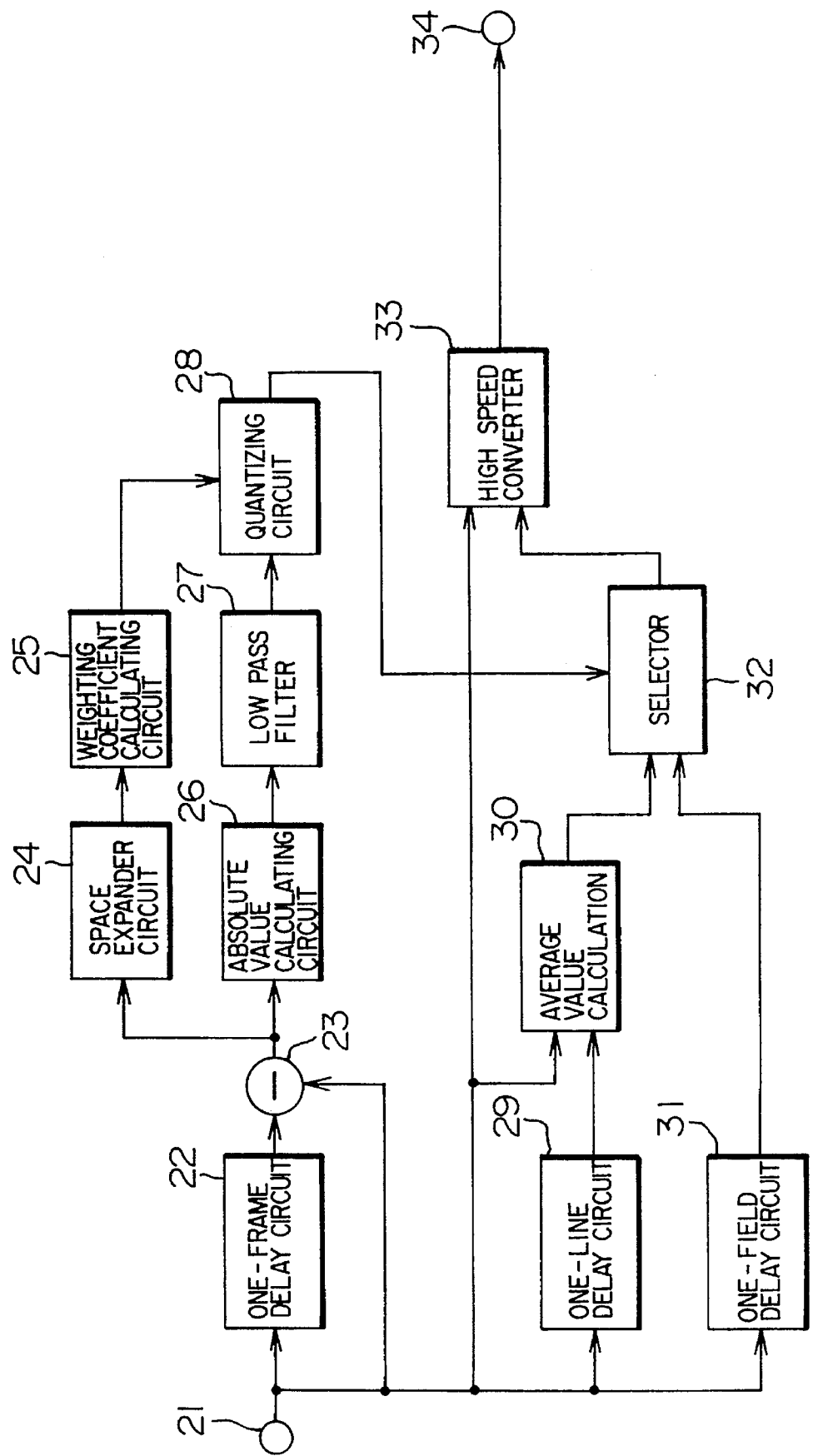
FIG. 1 is a block diagram showing an embodiment of the video signal processing apparatus of the present invention.

FIG. 1 is a diagram showing an arrangement of an embodiment of the video signal processing apparatus according to the present invention.

In FIG. 1, reference numeral 21 denotes a video signal input terminal, 22 a one-frame delay circuit, 23 a subtractor, 24 a space expander circuit, 25 a weighting coefficient generating circuit, 26 an absolute value calculating circuit, 27 a low pass filter, 28 a quantizing circuit, 29 a one-line delay circuit, 30 an average value calculating circuit, 31 a one-field delay circuit, 32 a selector, 33 a high speed converter, and 34 a video signal output terminal.

Figure 2A:
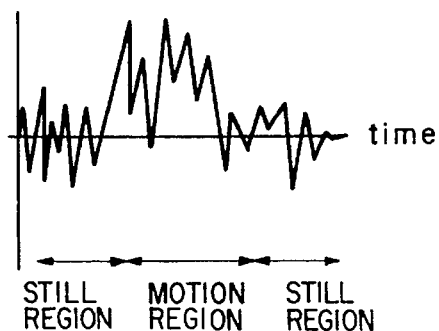
FIGS. 2A to 2E are diagrams for explaining the operation with a motion signal of the same level as noise in the embodiment.

The above-mentioned embodiment will be described with reference to FIGS. 2A to 2E, and FIGS. 3A to 3E. Suppose that an input video signal having a motion signal of the same level as noise is input to the video signal input terminal 21. This video signal and the video signal delayed one frame by the one-frame delay circuit 22 are input to the subtractor 23, which obtains a difference value of the two signals. In other words, an output signal of the subtractor 23 is an inter-frame difference signal. An example of the inter-frame difference signal at this time is shown in FIG. 2A.

Then, the space expander circuit 24 obtains inter-frame signal difference values of the 5×5 pixels in a space surrounding the pixel for detecting motion information. From those difference values, the weighting coefficient generating circuit 25 generates a weighting coefficient for the pixel for detecting motion information.

The operation of the weighting coefficient generating circuit 25 will next be described. The weighting coefficient circuit 25 classifies 25 difference values output from the space expander circuit 24 into three groups shown below, and counts the number of pixels of each group.

Group P: th1 ≦ difference value

Group Z: th2 < difference value < th1

Group N: difference value ≦ th2 where th1 and th2 are the first and second threshold values (th2 ≦ th1)

Number of pixels of group P=p

Number of pixels of group Z=z

Number of pixels of group N=n

From p and n, an intermediate variable e and the weighting coefficient α are generated as follows.

When p>n  $e=n/p$

Otherwise  $e=p/n$

When $0 \leq e \leq d1$  α=gain1

When $d1<e<d2$  α=1.0

When $d2<e<1$  α=gain2 where d1 and d2 are threshold values (d1 ≦ d2), gain1 and gain2 are constants (gain1 ≦ 1.0;

gain2 ≧ 1.0)

Figure 2B:
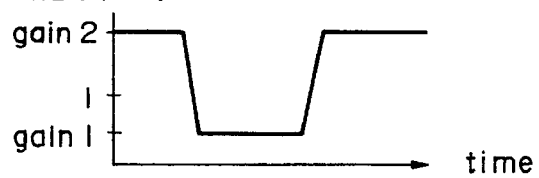

Therefore, the weighting coefficient for the inter-frame difference signal shown in FIG. 2A is as shown in FIG. 2B.

Figure 2C:
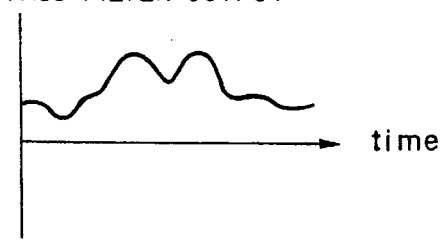

The inter-frame difference signal output from the subtractor 23 is input to the absolute value calculating circuit 26 to calculate its absolute value, and after noise is removed by the low pass filter 27, the inter-frame difference signal is output to the quantizing circuit 28. FIG. 2C shows a result of the absolute value calculation process and the low pass filter process performed on the inter-frame difference signal shown in FIG. 2A.

Next, the operation of the quantizing circuit 28 will be described. The quantizing circuit 28 performs a threshold value process on the inter-frame difference signal sent from the low pass filter 27 to digitize the signal into binary codes. The thus digitized signal becomes a motion signal. A threshold value th3 used for this digitization is decided by a weighting coefficient α output from the weighting coefficient circuit 25 as shown below. In this operation, an initial threshold value th4 is a threshold value which is set in advance.

$$th3=th4\times\alpha$$

Figure 2D:
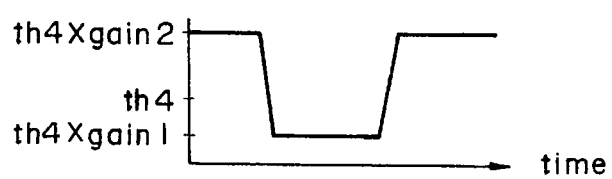

The threshold value th3 for the weighting coefficient in FIG. 2B is as shown in FIG. 2D.

Figure 2E:
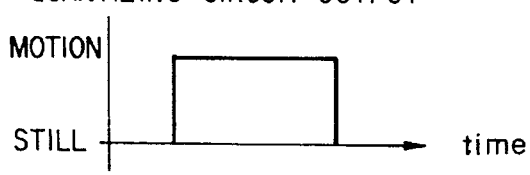

The quantizing circuit 28 digitizes the output signal of the low pass filter 27 by using the threshold value th3. More specifically, the output signal of the quantizing circuit 28 for a signal shown in FIG. 2C is as shown in FIG. 2E.

From the above description, it will be understood that detection of motion information can be performed nicely with a motion signal of the same level as noise.

The input video signal and the video signal delayed one line period by the one-line delay circuit 29 are input to the average value calculating circuit 30 to calculate an average value. This is the average value of two lines adjacent to each other in the same field, which means that an interpolation scanning line signal is generated by intra-field processing. On the other hand, the input video signal is also input through a separate route to the one-field delay circuit 31 and is delayed one field period. This means that the interpolation scanning signal is generated from the previous field signal.

In the selector 32, according to the motion signal output from the quantizing circuit 28, a signal from the one-field delay circuit 31 is selected and output for a "still" portion of the image, while a signal from the average value calculating circuit 30 is selected and output for a "motion" portion of the image. At the high speed converter 33, the input video signal and output of the selector 32 are output alternately line after line. When the signal is output as mentioned above, the signal's speed is twice as fast as the input video signal. In other words, the output of the high speed converter 33 becomes the non-interlaced scanning video signal and output from the video signal output terminal 34.

Then, description will now be made of the operation when a video signal is input which is obtained when a fine-patterned object moves in parallel translation.

Figure 3A:
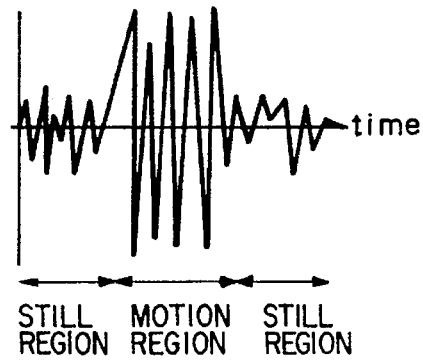
FIGS. 3A to 3E are diagrams for explaining the operation with a signal obtained when a fine-patterned object moves in parallel translation in the embodiment.
Figure 3B:
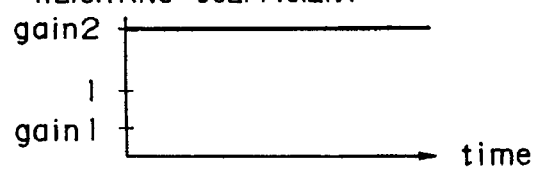
Figure 3C:
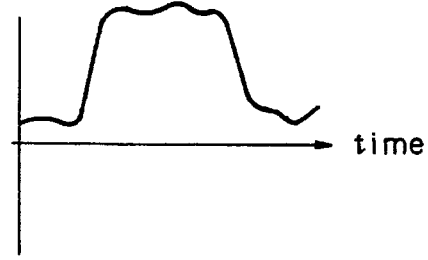
Figure 3D:
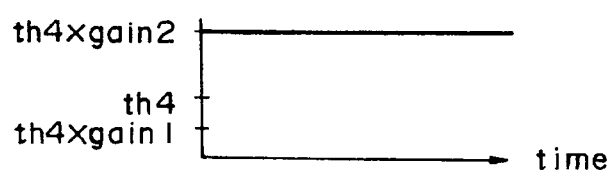
Figure 3E:
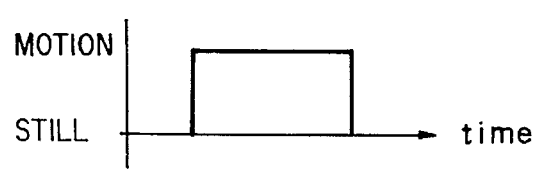
Figure 4:
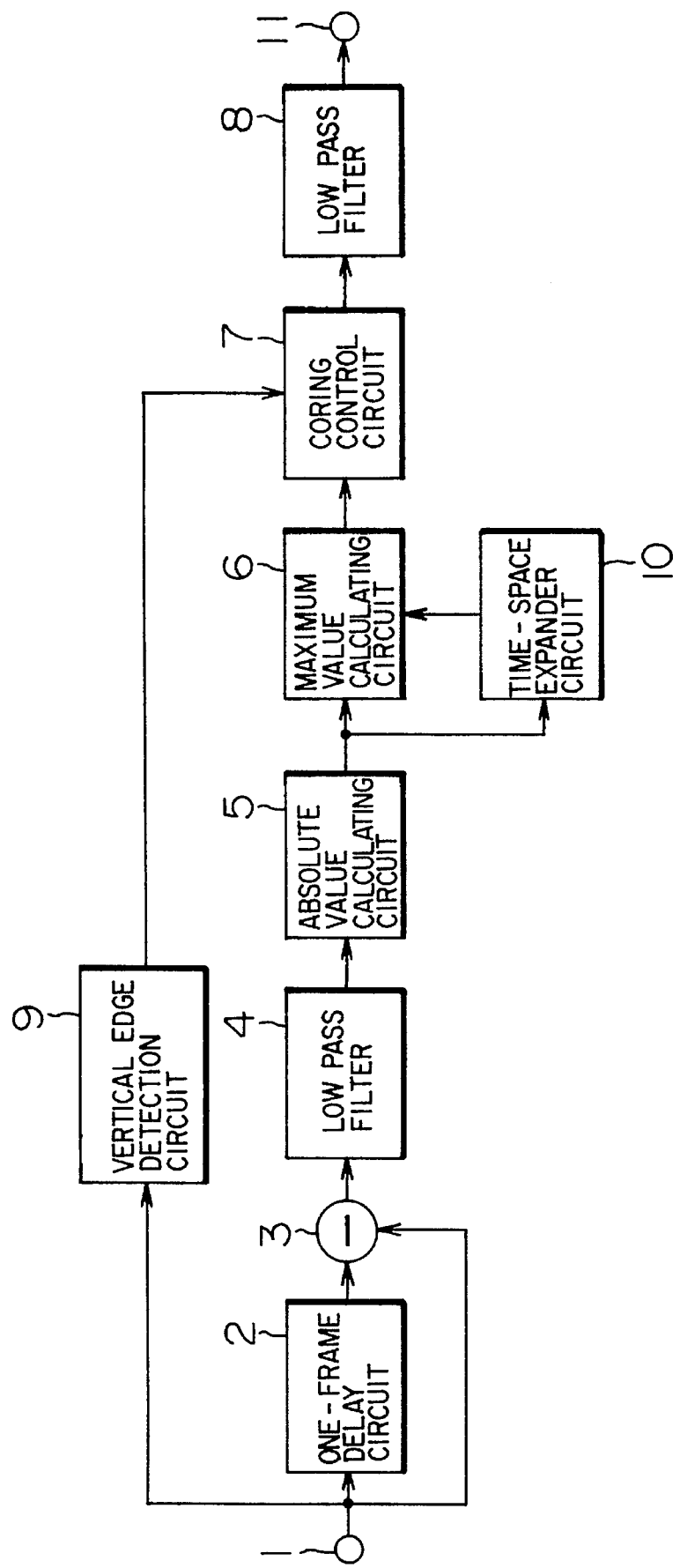
FIG. 4 is a block diagram showing the conventional video signal processing apparatus.
Figure 5:
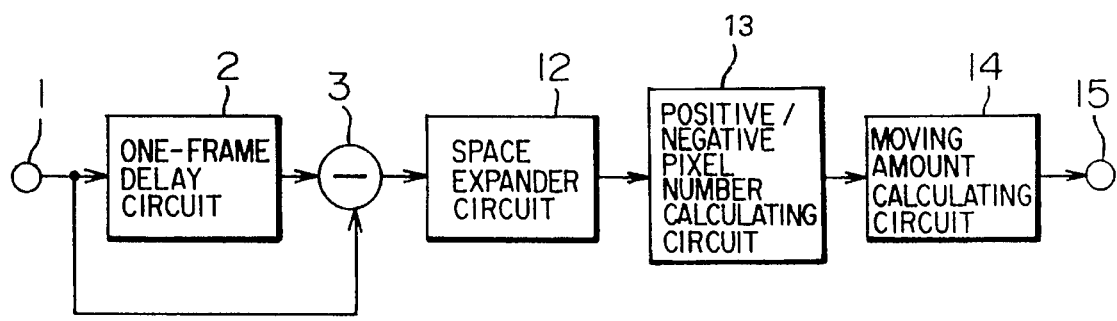
FIG. 5 is a block diagram showing another type of conventional video signal processing apparatus.
Figure 6:
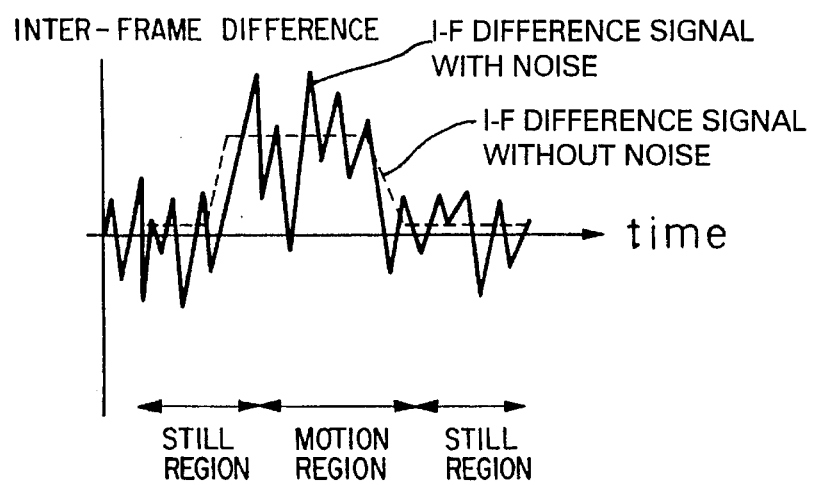
FIG. 6 is a diagram for explaining the operation with a motion signal of the same level as noise in the prior art.

An example of output of the subtractor 23, that is, an inter-frame difference signal is shown in FIG. 3A. In FIG. 3A, a portion of the inter-frame difference signal which fluctuates with great amplitudes across the time axis is the moving-image region. The weighting coefficient for the inter-frame difference signal such as this is α=gain2 as shown in FIG. 3B because the p and n in the above description are almost the same number for the whole region. Therefore, the threshold value th3 in the quantizing circuit 28 is as shown in FIG. 3D. However, the amplitude of the inter-frame difference signal in the moving-image region is large enough compared with the amplitude of the inter-frame difference signal in the still-image region, so that the output after the absolute value calculation process and the low pass filter process is as shown in FIG. 3C. Accordingly, output of the quantizing circuit 28 occurs as shown in FIG. 3E, and from this it is understood that the detection of motion information is going on nicely. The method of conversion to the non-interlaced scanning video signal in this case is the same as has been described above.

In the above-mentioned embodiment, by performing the threshold value process after the parameter (initial threshold value) used for quantization has been multiplied by the weighting coefficient α, excellent motion information detection can be carried out.

It should be noted that, although, in the above-mentioned embodiment, 5×5 pixels were set as the number of the surrounding pixels used for calculating the inter-frame difference values, any other number of pixels may be set.

In the above-mentioned embodiment, in the generation of the weighting coefficient, the intermediate variable e was derived from a ratio of p to n, but may be derived from a difference between p and n.

In the above-mentioned embodiment, the weighting coefficient α was generated by performing a threshold value process on e, but α may be obtained by some function.

In the above-mentioned embodiment, the quantization threshold value th3 was obtained by multiplying the initial threshold value th4 of the quantizing circuit by the weighting coefficient α, but the α may be obtained by some function.

In the above-mentioned embodiment, the motion signal after quantization is digitized into binary data, but by setting a plurality of threshold values, the motion signal may be quantized into multi-value, greater than binary, data.

As is apparent from the above-mentioned embodiments, the present invention has an arrangement that a weighting coefficient for motion information is generated by using inter-frame difference signals of both the pixel for detecting motion information and the pixels in a space surrounding the pixel for detecting motion information, and by using this weighting coefficient, the quantizing parameter (initial threshold value) of the inter-frame difference signal at the pixel for detecting motion information is controlled. The invention can realize excellent motion information detection both from the video signal having an inter-frame difference signal of the same level as noise and the video signal obtained when a fine-patterned object moves in parallel translation.

I claim:

1. A motion signal detection method for detecting motion information of an input video signal, comprising the steps of:

(a) delaying said input video signal by one frame;

(b) obtaining a difference signal between said input video signal and said delayed video signal at a pixel of interest for detecting the motion information and at pixels in a space surrounding said pixel of interest;

(c) counting, in a group defined by said pixel of interest and said pixel in said space, a first number of pixels each having a difference signal between said input video signal and said delayed video signal that is greater than a first threshold value and a second number of pixels each having a difference signal between said input video signal and said delayed video signal that is smaller than a second threshold value;

(d) generating a weighting coefficient for the motion information at said pixel of interest on the basis of said first number and said second number; and (e) controlling a quantizing parameter of the difference signal at said pixel of interest by using said weighting coefficient to detect the motion information o said input video signal at said pixel of interest.

2. A video signal processing apparatus for converting an input interlaced scanning video signal into a non-interlaced scanning video signal, comprising:

a motion detection circuit for detecting motion information in an input video signal by the motion detection method according to claim 1; and an interpolation scanning line generating circuit for generating interpolation scanning lines by adaptively switching over an intra-field interpolation process and an inter-field interpolation process according to said detected motion information.

3. A motion signal detecting method for detecting motion information of an input video signal, comprising the steps of:

(a) delaying said input video signal by one frame;

(b) obtaining a difference signal between said input video signal and said delayed video signal at a pixel of interest for detecting the motion information and at pixels in a space surrounding said pixel of interest;

(c) counting, in a group defined by said pixel of interest and said pixels in said space, first number of pixels each having a difference signal between said input video signal and said delayed video signal that is greater than a first threshold value and a second number of pixels each having a difference signal between said input video signal and said delayed video signal that is smaller than a second threshold value;

(d) obtaining a ratio between the first number and the second number;

(e) generating a weighting coefficient for the motion information at said pixel of interest on the basis of said ratio; and (f) controlling a quantizing parameter of the difference signal at said pixel of interest by using said weighting coefficient to detect the motion information of said input video signal at said pixel of interest.

4. A video signal processing apparatus for converting an input interlaced scanning video signal into a non-interlaced scanning video signal, comprising:

a motion detection circuit for detecting motion information in an input video signal by the motion detection method according to claim 3; and an interpolation scanning line generating circuit for generating interpolation scanning lines by adaptively switching over an intra-field interpolation process and an inter-field interpolation process according to said detected motion information.

5. A motion signal detection method for detecting motion information of am input video signal, comprising the steps of:

(a) delaying said input video signal by one frame;

(b) obtaining a difference signal between said input video signal and said delayed video signal at a pixel of interest for detecting the motion information and at pixels in a space surrounding said pixel of interest;

(c) counting, in a group defined by said pixel of interest and said pixels in said space, a first number of pixels each having a difference signal between said input video signal and said delayed video signal that is greater than a first threshold value and a second number of pixels each having a difference signal between said input video signal and said delayed video signal that is smaller than a second threshold value;

(d) determining an absolute value of a difference between the first number and the second number;

(e) generating a weighting coefficient for the motion information at said pixel of interest on the basis of said absolute value; and (f) controlling a quantizing parameter of the difference signal at said pixel of interest by using said weighting coefficient to detect the motion information of said input video signal at said pixel of interest.

6. A video signal processing apparatus for converting an input interlaced scanning video signal into a non-interlaced scanning video signal, comprising:

a motion detection circuit for detecting motion information in an input video signal by the motion signal detection method according to claim 5; and an interpolation scanning line generating circuit for generating interpolation scanning lines by adaptively switching over an intra-field interpolation process and an inter-field interpolation process according to said detected motion information.

7. A video signal processing method comprising:

(a) receiving an input video signal;

(b) delaying said input video signal by one frame;

(c) obtaining a difference signal between said input video signal and said delayed video signal at a pixel of interest for detecting motion information of said input video signal and at pixels in a space surrounding said pixel of interest;

(d) counting, in a group defined by said pixel of interest and said pixels in said space, a first number of pixels each having a difference signal between said input video signal and said delayed video signal that is greater than a first threshold value and a second number of pixels each having a difference signal between said input video signal and said delayed video signal that is smaller than a second threshold value;

(e) generating a weighting coefficient for the motion information at said pixel of interest on the basis of said first number and said second number;

(f) controlling a quantizing parameter of the difference signal at said pixel of interest by using said weighting coefficient to detect the motion information of said input video signal at said pixel of interest;

(g) generating, in accordance with said quantizing parameter, a motion signal representing said motion information;

(h) performing a first processing operation on said input video signal to generate a first interpolation signal;

(i) performing a second processing operation on said input video signal to generate a second interpolation signal;

(j) selecting one of said first and second interpolation signals in accordance with said motion signal; and (k) providing an output video signal by outputting said input video signal and said selected one of said first and second interpolation signals alternately line-after-line.

8. A method as in claim 7, wherein said first processing operation is an intra-field processing operation and said second processing operation is an inter-field processing operation.

9. A method as in claim 7, wherein step (g) comprises digitizing said difference signal at said pixel of interest in accordance with said quantizing parameter to generate said motion signal representing said motion information.

10. A video signal processing method comprising:

(a) receiving an input video signal;

(b) delaying said input video signal by one frame;

(c) obtaining a difference signal between said input video signal and said delayed video signal at a pixel of interest for detecting motion information of said input video signal and at pixels in a space surrounding said pixel of interest;

(d) counting, in a group defined by said pixel of interest and said pixel in said space, a first number of pixels each having a difference signal between said input video signal and said delayed video signal that is greater than a first threshold value and a second number of pixels each having a difference signal between said input video signal and said delayed video signal that is smaller than a second threshold value;

(e) obtaining a ratio between the first number and the second number;

(f) generating a weighting coefficient for the motion information at said pixel of interest on the basis of said ratio;

(g) controlling a quantizing parameter of the difference signal at said pixel of interest by using said weighting coefficient to detect the motion information of said input video signal at said pixel of interest;

(h) generating, in accordance with said quantizing parameter, a motion signal representing said motion information;

(i) performing a first processing operation on said input video signal to generate a first interpolation signal;

(j) performing a second processing operation on said input video signal to generate a second interpolation signal;

(k) selecting one of said first and second interpolation signals in accordance with said motion signal; and (l) providing an output video signal by outputting said input video signal and said selected one of said first and second interpolation signals alternately line-after-line.

11. A method as in claim 10, wherein said first processing operation is an intra-field processing operation and said second processing operation is an inter-field processing operation.

12. A method as in claim 10, wherein step (h) comprises digitizing said difference signal at said pixel of interest in accordance with said quantizing parameter to generate said motion signal representing said motion information.

13. A video signal processing method comprising:

(a) receiving an input video signal;

(b) delaying said input video signal by one frame;

(c) obtaining a difference signal between said input video signal and said delayed video signal at a pixel of interest for detecting motion information of said input video signal and at pixels in a space surrounding said pixel of interest;

(d) counting, in a group defined by said pixel of interest and said pixel in said space, a first number of pixels each having a difference signal between said input video signal and said delayed video signal that is greater than a first threshold value and a second number of pixels each having a difference signal between said input video signal and said delayed video signal that is smaller than a second threshold value;

(e) determining an absolute value of a difference between the first number and the second number;

(f) generating a weighting coefficient for the motion information at said pixel of interest on the basis of said absolute value;

(g) controlling a quantizing parameter of the difference signal at said pixel of interest by using said weighting coefficient to detect the motion information of said input video signal at said pixel of interest;

(h) generating, in accordance with said quantizing parameter, a motion signal representing said motion information;

(i) performing a first processing operation on said input video signal to generate a first interpolation signal;

(j) performing a second processing operation on said input video signal to generate a second interpolation signal;

(k) selecting one of said first and second interpolation signals in accordance with said motion signal; and (l) providing an output video signal by outputting said input video signal and said selected one of said first and second interpolation signals alternately line-after-line.

14. A method as in claim 13, wherein said first processing operation is an intra-field processing operation and said second processing operation is an inter-field processing operation.

15. A method as in claim 13, wherein step (h) comprises digitizing said difference signal at said pixel of interest in accordance with said quantizing parameter to generate said motion signal representing said motion information.

* * * * *